United States Patent Office 3,275,656
Patented Sept. 27, 1966

3,275,656
Δ$^{1(10),5}$-19-NOR PREGNADIENES AND PROCESS THEREFOR
Albert Bowers and Otto Halpern, Mexico City, Mexico, assignors to Syntex Corporation, Panama, Panama, a corporation of Panama
No Drawing. Filed July 9, 1963, Ser. No. 293,831
Claims priority, application Mexico, Mar. 14, 1963, 71,257
20 Claims. (Cl. 260—239.55)

The present invention relates to certain novel cyclopentanoperhydrophenanthrene derivatives and to the method for the production thereof.

More particularly, it relates to the novel Δ$^{1(10),5}$-19-nor pregnane derivatives and to the method for making the same.

The novel compounds of the present invention are represented by the following formulas:

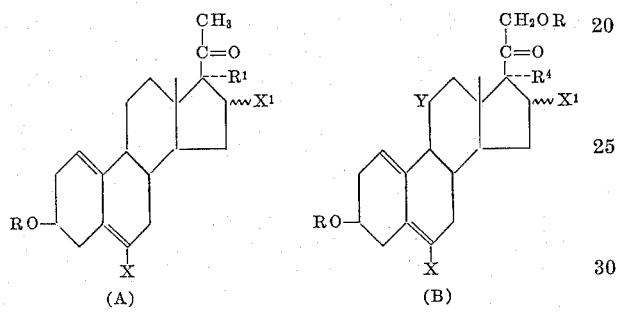

(A)           (B)

In the above formulas R represents hydrogen or an acyl radical of less than 12 carbon atoms; Y represents hydrogen, β-hydroxy or keto; X represents hydrogen, a lower alkyl, alkenyl or alkinyl radical; R$^1$ represents hydrogen, hydroxy or an acyloxy radical of less than 12 carbon atoms; R$^4$ represents hydroxy; X$^1$ represents hydrogen, α-methyl, β-methyl, α-hydroxy or α-acyloxy; X$^1$ together with the hydroxyl group at 17α represent the grouping

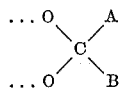

wherein A represents hydrogen or a lower alkyl radical and B represents lower alkyl, aryl or aralkyl of up to eight carbon atoms.

The acyl and acyloxy groups above referred to are derived from hydrocarbon carboxylic acids containing less than 12 carbon atoms which may be saturated or unsaturated, of straight, branched, cyclic or cyclic-aliphatic chain, or aromatic, and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate, and β-chloropropionate.

The compounds represented by A are progestational agents useful in the maintenance of pregnancy and fertility control. They also relieve premenstrual tension and are useful in general in the treatment of female diseases.

The compounds represented by B are cortical hormones with anti-inflammatory activity, useful in the treatment of rheumatism, arthritis, dermatitis and inflammation of the eyes and ears.

In addition to the hereinbefore indicated biological activities, the compounds of the present invention are valuable intermediates for the synthesis of many ring A aromatic and 19-nor compounds, which as well known, possess biological activities.

The compounds possessing progestational activity are obtained by the method illustrated by the following sequence of reactions:

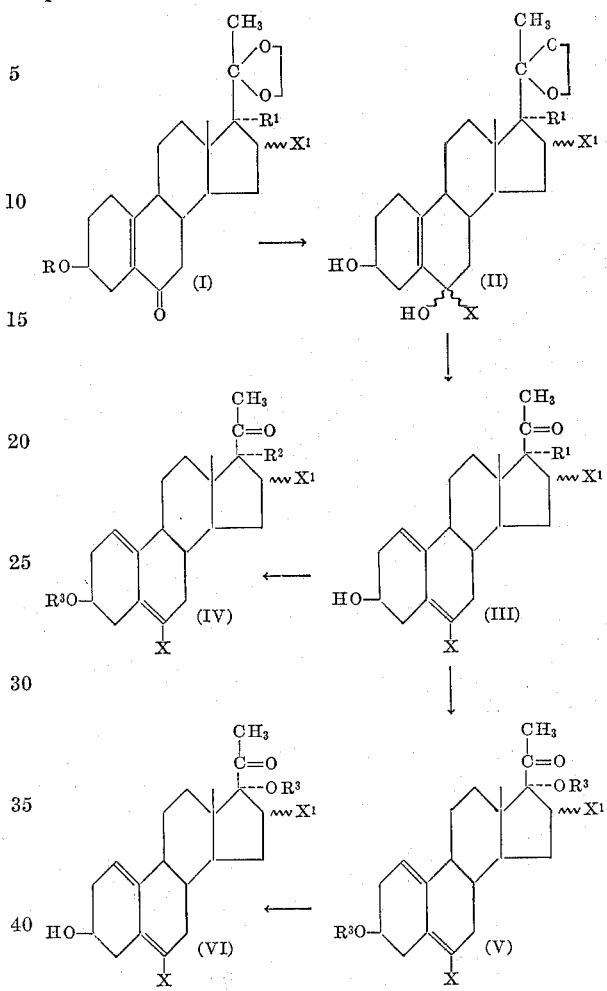

In the preceding formulas X, X$^1$, R and R$^1$ have the same meaning as heretofore indicated; R$^2$ represents hydrogen or hydroxyl and R$^3$ represents an acyl radical of less than 12 carbon atoms.

In practicing the process outlined above, the starting 20-ketal derivative of a 3-acyloxy-6-keto-Δ$^{5(10)}$-19-nor pregnene (I) is obtained by oxidation of a corresponding 3-acyloxy-19-hydroxy-Δ$^5$-compound with chromium trioxide in pyridine, in accordance with our copending patent application, Serial No. 293,891, filed July 9, 1963.

By reaction of these 6-keto-Δ$^{5(10)}$-19-nor-pregnenes (I) with a double metal hydride, preferably with lithium aluminum hydride in tetrahydrofuran solution at reflux temperature, the keto group at C–6 is reduced and the acyloxy groups at C–3 or at C–3 and C–17 (when the starting materials possess said group) are saponified, thus producing the 3,6-dihydroxy or 3,6,17-trihydroxy compounds (mixture of 6α and 6β-isomers) (II; X=H).

Alternatively, when said starting materials are reacted with an alkyl, alkenyl or alkinyl magnesium halide, at reflux temperature and for a period of time of between 2 to 6 hours, a hydrocarbon radical is introduced at C–6 with simultaneous saponification of the esterified hydroxyl group (II; X=alkyl, alkenyl, alkinyl).

This transformation may also be achieved by using an alkyl lithium or the sodium or potassium salt of a lower alkyne, by methods well known in the art.

Treatment of the Δ$^{5(10)}$-3,6-dihydroxy or 3,6,17-trihydroxy compounds (II) with a proton donor, preferably with an acid such as 50% acetic acid, for a period of time in the order of 30 minutes to 4 hours at a temperature of between 70° and 100° C. affords the 3-hydroxy-$\Delta^{1(10),5}$-19-nor-pregnadienes (III; $R^1$=H, OH), with simultaneous hydrolysis of the ketal group group at C-20.

Instead of aqueous acetic acid, there can be used a strong acid, such as for example hydrochloric acid, sulfuric acid, perchloric acid, p-toluenesulfonic acid, and the like, in a solvent inert to the reaction, at room temperature and for a period of time of between 10 minutes to 4 hours. Among the solvents used for this reaction there are diethyl ether, isoproply ether, tetrahydrofuran, dioxane, Dowanol, and other similar solvents.

Treatment of the latter compounds with an acid anhydride or acid chloride derived from a carbonyl acid of less than 12 carbon atoms, in pyridine solution, gives rise to the C-3 esters (IV).

The compounds hydroxylated at C-17 (III; $R^1$=OH), may be converted into the respective diester (V) by reaction with carboxylic acid anhydrides of less than 12 carbon atoms in benzene solution and in the presence of p-toluenesulfonic acid.

By selective saponification of the acyloxy group at C-3, using a dilute methanol solution of potassium hydroxide or potassium carbonate, as low temperature, there are obtained the 17-monoesters (VI).

Compounds esterified at C-3 and C-17 by different carboxylic acids may be obtained by reesterification of VI in pyridine solution, in a conventional manner.

Examples of starting materials for this process are: 3-acetoxy-20-ethylenedioxy - $\Delta^{5(10)}$-19-nor-pregnen-6-one, 3-acetoxy - 20 - ethylenedioxy-$\Delta^{5(10)}$-19-nor-pregnen-17α-ol-6-one, 3,17 - diacetoxy-20-ethylenedioxy-$\Delta^{5(10)}$-19-nor-pregnen-6-one, 16α - methyl-3-acetoxy-20-ethylenedioxy-$\Delta^{5(10)}$-19-nor-pregnen-6-one and 16α,17α-isopropylidene-dioxy - 3-acetoxy-20-ethylenedioxy-$\Delta^{5(10)}$-19-nor-pregnen-6-one.

The compounds possessing the dihydroxyacetone side chain, which may further have an oxygenated function at C-11, are obtained by the method illustrated by the following reaction sequence:

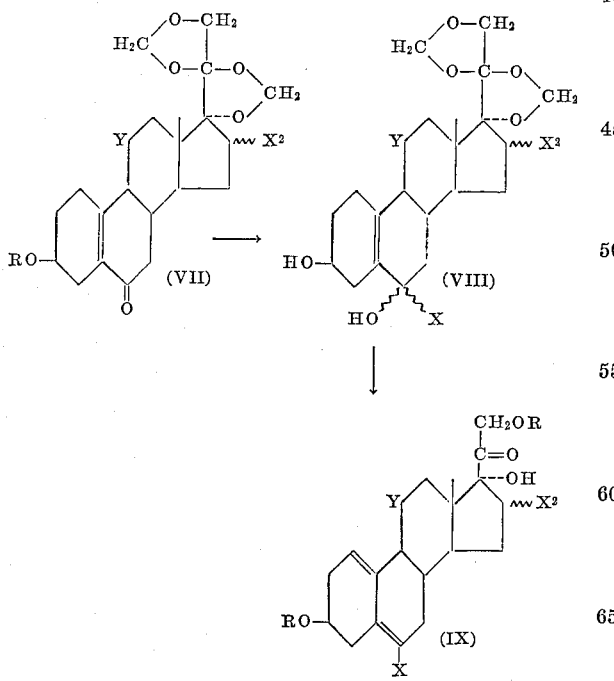

In the preceding formulas X, Y and R have the meaning heretofore indicated; and $X^2$ represents hydrogen, α or β-methyl.

In practicing the process outlined above, the starting materials are the 17,20;20,21-bismethylenedioxy-3-acyloxy-6-keto-$\Delta^{5(10)}$-19-nor-pregnenes (VII), obtained by the method of our hereinbefore mentioned copending patent application Serial No. 293,891 which by reduction with lithium aluminum hydride give rise to the 3,6-dihydroxy or 3,6,11-trihydroxy compounds (VIII; X=H; Y=H, OH), or by treatment with an alkyl, alkenyl or alkinyl magnesium halide, as indicated above in detail, produce the respective 6-substituted compounds (VIII; X=alkyl, alkenyl, alkinyl).

By reaction of these compounds with aqueous acetic acid with a strong acid in a solvent inert to the reaction, there are obtained the corresponding $\Delta^{1(10),5}$-19-nor-pregnadienes whose bismethylenedioxy group is hydrolyzed by refluxing with 60% formic acid, thus regenerating the dihydroxyacetone side chain (IX; R=H). These compounds are converted into the 3,21-diesters by esterification with acid anhydrides or acid chlorides of the type indicated hereinbefore, in pyridine solution (IX; R=acyl).

Alternatively, the dehydration and the hydrolysis of the bismethylenedioxy group of the 6-hydroxy-$\Delta^{5(10)}$-19-nor compounds (VIII) may be achieved if the reaction with aqueous acetic acid is effected for a prolonged period of time, i.e. for 7 to 10 hours.

The C-11 hydroxylated compounds (IX; Y=OH, R=acyl) are converted into the corresponding 11-keto derivatives (IX; Y=keto) by oxidation with 8 N chromic acid in acetone solution or chromic acid in aqueous acetic acid; upon saponification of these compounds with potassium hydroxide or potassium carbonate in methanol solution, at low temperature, preferably at 0-5° C., there are produced the respective free compounds (IX; R=H, Y=keto).

These compounds having the dihydroxyacetone side chain may be obtained alternatively as indicated in the following equation from the respective $\Delta^{1(10),5}$-3-acyloxy-17α-hydroxy-19-nor-pregnadienes (X), by treatment with iodine in the presence of calcium oxide and in mixture of tetrahydrofuran-methanol to give the 21-iodo derivatives, followed by substitution of the iodine for an acetoxy group, by reaction with potassium acetate in acetone solution, in accordance with the method described by H. J. Ringold et al. in J. Am. Chem. Soc. 80, 250 (1958), and conventional saponification of the acyloxy group at C-3 and C-21 (XI).

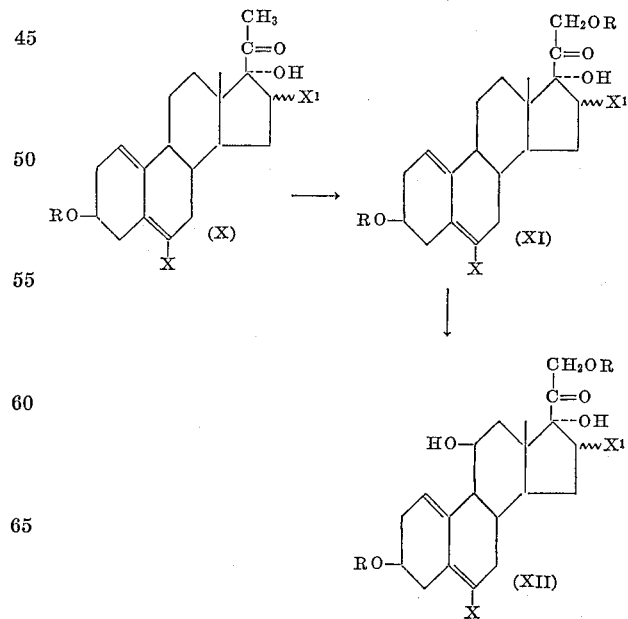

In the above equation X, $X^1$ and R have the same meaning as heretofore described.

The compounds unsubstituted at C-11 and/or at C-16 can be hydroxylated in these positions by microbiological methods well known to the skilled in the art, such as for example, by incubation with adrenal glands, Curvularia

*lunata, Cunninghamella blakesleeana* or *Cunninghamella bainieri* for the hydroxylation at C–11β, or using *Streptomyces roseochromogenus* to hydroxylate C–16α to thus afford compounds XII.

The following specific examples illustrate, but are not intended to limit the scope of the present invention:

PREPARATION 1

A mixture of 5 g. of the 3-acetate of Δ⁵-pregnene-3β, 19-diol-20-one, 75 cc. of 2-methyl-2-ethyl-1,3-dioxolane and 200 mg. of p-toluenesulfonic acid was heated to boiling and refluxed with distillation for 1 hour. The mixture was cooled, diluted with water, extracted with ethyl acetate and the organic extract washed to neutral, dried and evaporated to dryness. Crystallization from acetone-hexane gave 3-acetoxy-20-ethylenedioxy-Δ⁵-pregnen-19-ol.

A solution of 5 g. of the preceding compound in 60 cc. of pyridine was added to a mixture of 5 g. of chromium trioxide in 60 cc. of pyridine. The reaction mixture was kept at room temperature for one week; at the end of this time, it was diluted with ethyl acetate, filtered through celite and the filtrate washed with water, dried and evaporated to dryness. Crystallization from acetone-hexane yielded 3-acetoxy-20-ethylenedioxy-Δ⁵⁽¹⁰⁾-19-nor-pregnen-6-one.

In the same manner, starting from the 3-monoacetate of 16α-methyl-Δ⁵-pregnene-3β,19-diol-20-one, the 3-monoacetate of 16β-methyl-Δ⁵-pregnene-3β,19-diol-20-one, the 3-monoacetate of 16α,17α-isopropylidenedioxy-Δ⁵-pregnene-3β,19-diol-20-one, the 3,17-diacetate of Δ⁵-pregnene-3β,17α,19-triol-20-one and the 3,17-diacetate of 16α-methyl-Δ⁵-pregnene-3β,-17α,19-triol-20-one, there were obtained as final products: 3-acetoxy-20-ethylenedioxy-16α - methyl - Δ⁵⁽¹⁰⁾-19-nor-pregnen-6-one, 3-acetoxy-20-ethylenedioxy-16β-methyl-Δ⁵⁽¹⁰⁾-19-nor-pregnen-6-one, 3-acetoxy - 20-ethylenedioxy-16α,17α-isopropylidenedioxy-Δ⁵⁽¹⁰⁾-19-nor-pregnen-6-one, 3,17-diacetoxy-20-ethylenedioxy-Δ⁵⁽¹⁰⁾-19-nor-pregnen-6-one and 3,17-diacetoxy-16α - methyl - 20-ethylenedioxy-Δ⁵⁽¹⁰⁾-19-nor-pregnen-6-one.

Example I

A solution of 5 g. of 3-acetoxy-20-ethylenedioxy-Δ⁵⁽¹⁰⁾-19-nor-pregnen-6-one in 150 cc. of anhydrous tetrahydrofuran was added over a 30 minute period to a stirred suspension of 3 g. of lithium aluminum hydride in 150 cc. of anhydrous tetrahydrofuran. The mixture was heated at reflux temperature for 2 hours; it was then cooled and carefully treated with 5 cc. of ethyl acetate and 2 cc. of water. Solid sodium sulfate was added, the inorganic material filtered off and washed several times with hot ethyl acetate; the combined organic solutions were evaporated to dryness, to produce 20-ethylenedioxy-Δ⁵⁽¹⁰⁾-19-nor-pregnene-3β,6-diol (mixture of 6α and 6β-isomers).

Example II

A solution of 5 g. of 3-acetoxy-20-ethylenedioxy-Δ⁵⁽¹⁰⁾-19-nor-pregnen-6-one in 250 cc. of benzene thiophene free was treated with 27.5 cc. of a 4 N solution of methyl magnesium bromide in ether, and the mixture was refluxed for 3 hours with the exclosure of moisture. The cooled mixture was treated carefully with an excess of aqueous ammonium chloride solution and the product isolated by ethyl acetate extraction. The extract was washed with water, dried over anhydrous sodium sulfate and evaporated to dryness, thus yielding 20-ethylenedioxy-6-methyl-Δ⁵⁽¹⁰⁾-19-nor-pregnene-3β,6-diol (mixture of 6α and 6β-isomers).

By the same method but using ethyl, vinyl, ethinyl and propargyl magnesium bromide, there were obtained respectively: 20 - ethylenedioxy-6-ethyl-Δ⁵⁽¹⁰⁾-19-nor-pregnene - 3β,6-diol, 20-ethylenedioxy-6-vinyl-Δ⁵⁽¹⁰⁾-19-nor-pregnene-3β,6-diol, 20-ethylenedioxy-6-ethinyl-Δ⁵⁽¹⁰⁾-19-nor-pregnene-3β,6-diol and 20-ethylenedioxy-6-propargyl-Δ⁵⁽¹⁰⁾-19-nor-pregnene-3β,6-diol.

Example III

By following the method described in Example I, the compounds below mentioned (I) were reduced with lithium aluminum hydride, to produce the compounds listed under II:

| I | II |
| --- | --- |
| 16α-methyl-3-acetoxy-20-ethylenedioxy-Δ⁵⁽¹⁰⁾-19-nor-pregnen-6-one. | 16α-methyl-20-ethylenedioxy-Δ⁵⁽¹⁰⁾-19-nor-pregnen-3β,6-diol. |
| 16β-methyl-3-acetoxy-20-ethylenedioxy-Δ⁵⁽¹⁰⁾-19-nor-pregnen-6-one. | 16β-methyl-20-ethylenedioxy-Δ⁵⁽¹⁰⁾-19-nor-pregnen-3β,6-diol. |
| 16α,17α-isopropylidenedioxy-20-ethylenedioxy-Δ⁵⁽¹⁰⁾-19-nor-pregnen-6-one. | 16α,17α-isopropylidenedioxy-20-ethylenedioxy-Δ⁵⁽¹⁰⁾-19-nor-pregnen-3β,6-diol. |
| 3,17-diacetoxy-20-ethylenedioxy-Δ⁵⁽¹⁰⁾-19-nor-pregnen-6-one. | 20-ethylenedioxy-Δ⁵⁽¹⁰⁾-19-nor-pregnen-3β,6,17α-triol. |
| 3,17-diacetoxy-16α-methyl-20-ethylenedioxy-Δ⁵⁽¹⁰⁾-19-nor-pregnen-6-one. | 20-ethylenedioxy-16α-methyl-Δ⁵⁽¹⁰⁾-19-nor-pregnen-3β,6,17α-triol. |

Example IV

A solution of 1 g. of 3-acetoxy-20-ethylenedioxy-Δ⁵⁽¹⁰⁾-19-nor-pregnen-6-one in 50 cc. of anhydrous benzene, was added, under nitrogen atmosphere, to a solution prepared by dissolving 1.4 g. of potassium in 30 cc. of t-amyl alcohol. A slow stream of purified acetylene was passed through the solution for 40 hours, diluted with water and extracted with benzene. The combined organic extracts were washed with water to neutral, dried over anhydrous sodium sulfate and evaporated to dryness under reduced pressure. The residue was chromatographed on 50 g. of neutral alumina, to produce 6-ethinyl-20-ethylenedioxy-Δ⁵⁽¹⁰⁾-19-nor-pregnene-3β,6-diol, identical to the product obtained by the method of Example II.

In a similar manner, 16α-methyl-3-acetoxy-20-ethylenedioxy-Δ⁵⁽¹⁰⁾-19-nor-pregnen-6 - one, 16α,17α - isopropylidenedioxy-3-acetoxy-20 - ethylenedioxy - Δ⁵⁽¹⁰⁾ - 19 - nor-pregnen-6 - one and 17,20;20,21 - bismethylenedioxy - 3-acetoxy-Δ⁵⁽¹⁰⁾-19-nor-pregnen-6-one were converted respectively into: 16α-methyl-6-ethinyl-20 - ethylenedioxy-Δ⁵⁽¹⁰⁾-19-nor-pregnen-3β,6-diol, 16α,17α - isopropylidenedioxy-20-ethylenedioxy-6-ethinyl-Δ⁵⁽¹⁰⁾-19-nor - pregnene-3β,6-diol and 17,20;20,21-bismethylenedioxy - 6 - ethinyl-Δ⁵⁽¹⁰⁾-19-nor-pregnene-3β,6-diol.

Example V

By following the method described in Example II, the starting materials of Example III were treated with methyl, vinyl and propargyl magnesium bromide, thus obtaining: 6,16α-dimethyl-20-ethylenedioxy-Δ⁵⁽¹⁰⁾-19-nor-pregnene-3β,6-diol, 6,16β-dimethyl - 20 - ethylenedioxy-Δ⁵⁽¹⁰⁾-19-nor-pregnene-3β,6-diol, 6-methyl-16α,17α - isopropylidenedioxy-20-ethylenedioxy-Δ⁵⁽¹⁰⁾-19 - nor - pregnene-3β,6-diol, 6-methyl-20-ethylenedioxy-Δ⁵⁽¹⁰⁾-19 - nor-pregnene-3β,6,17α-triol, 6,16α-dimethyl-20-ethylenedioxy-Δ⁵⁽¹⁰⁾-19-nor-pregnene-3β,6,17α-triol, 6-vinyl-16α - methyl-20-ethylenedioxy-Δ⁵⁽¹⁰⁾-19-nor-pregnene - 3β,6 - diol, 6-vinyl-16β-methyl-20-ethylenedioxy-Δ⁵⁽¹⁰⁾-19 - nor - pregnene-3β,6-diol, 6-vinyl,16α,17α-isopropylidenedioxy - 20-ethylenedioxy-Δ⁵⁽¹⁰⁾-19-nor-pregnene-3β,6-diol, 6 - vinyl-20-ethylenedioxy-Δ⁵⁽¹⁰⁾-19-nor-pregnene - 3β,6,17α - triol, 6-vinyl-16α-methyl-20-ethylenedioxy-⁵⁽¹⁰⁾-19 - nor - pregnene-3β,6,17α-triol, 6-propargyl-16α-methyl-20-ethylenedioxy-Δ⁵⁽¹⁰⁾-19-nor-pregnene-3β,6-diol, 6-propargyl - 16β-methyl-20-ethylenedioxy-Δ⁵⁽¹⁰⁾-19-nor - pregnene - 3β,6-diol, 6-propargyl-16α,17α-isopropylidenedioxy - 20 - ethylenedioxy-Δ⁵⁽¹⁰⁾-19-nor-pregnene-3β,6-diol, 6 - propargyl-20-ethylenedioxy-Δ⁵⁽¹⁰⁾-19-nor-pregnene - 3β,6,17α - triol and 6-propargyl-16α - methyl - 20 - ethylenedioxy - Δ⁵⁽¹⁰⁾-19-nor-pregnene-3β,6,17α-triol.

Example VI

A mixture of 2 g. of 20-ethylenedioxy-Δ⁵⁽¹⁰⁾-19-nor-pregnene-3β,6-diol and 100 cc. of 50% aqueous acetic acid was heated on the steam bath for 30 minutes, poured into water, extracted with methylene chloride and the organic extract washed with water, 10% sodium carbonate solution and water to neutral, dried over anhydrous sodium sulfate and evaporated to dryness, under vacuo. The residue was crystallized from acetone-hexane to give $\Delta^{1(10),5}$-19-nor-pregnadien-3$\beta$-ol-20-one.

By the same method, the compounds below mentioned (I) were converted into the corresponding $\Delta^{1(10),5}$-19-nor-pregnadienes (II):

| I | II |
|---|---|
| 6-methyl-20-ethylenedioxy-$\Delta^{5(10)}$-19-nor-pregnene-3$\beta$,6-diol. | 6-methyl-$\Delta^{1(10),5}$-19-nor-pregnadien-3$\beta$-ol-20-one. |
| 6-ethyl-20-ethylenedioxy-$\Delta^{5(10)}$-19-nor-pregnene-3$\beta$,6-diol. | 6-ethyl-$\Delta^{1(10),5}$-19-nor-pregnadien-3$\beta$-ol-20-one. |
| 6-vinyl-20-ethylenedioxy-$\Delta^{5(10)}$-19-nor-pregnene-3$\beta$,6-diol. | 6-vinyl-$\Delta^{1(10),5}$-19-nor-pregnadien-3$\beta$-ol-20-one. |
| 6-ethinyl-20-ethylidenedioxy-$\Delta^{5(10)}$-19-nor-pregnene-3$\beta$,6-diol. | 6-ethinyl-$\Delta^{1(10),5}$-19-nor-pregnadien-3$\beta$-ol-20 one. |
| 6-propargyl 20 ethylidene dioxy $\Delta^{5(10)}$-19-norpregnene-3$\beta$,6-diol. | 6-propargyl-$\Delta^{1(10),5}$-19-nor-pregnadien-3$\beta$-ol-20-one. |

Example VII

A solution of 2 g. of 6-methyl-20-ethylenedioxy-$\Delta^{5(10)}$-19-nor-pregnene-3$\beta$,6-diol in 70 cc. of tetrahydrofuran and 7 cc. of an 8% aqueous sulfuric acid solution was kept at room temperature for 40 minutes. It was then neutralized with a saturated sodium carbonate solution, concentrated to approximately 20 cc. under vacuo and poured into water. The formed precipitate was collected by filtration, and washed carefully with water. Upon crystallization from acetone-hexane there was obtained 6-methyl-$\Delta^{1(10),5}$-19-nor-pregnadien-3$\beta$-ol-20 - one, identical to the product obtained in the preceding example.

By the same method, 16$\alpha$-methyl-6-ethinyl-20-ethylenedioxy-$\Delta^{5(10)}$-19-nor-pregnene-3$\beta$,6-diol, 16$\alpha$,17$\alpha$ - isopropylidenedioxy-6-ethinyl-20-ethylenedioxy-$\Delta^{5(10)}$ - 19 - nor-pregnene-3$\beta$,6-diol and 17,20;20,21-bismethylenedioxy-6-ethinyl-$\Delta^{5(10)}$-19-nor-pregnene - 3$\beta$,6 - diol were converted respectively into 16$\alpha$-methyl - 6 - ethinyl-$\Delta^{1(10),5}$-19-nor-pregnadien-3$\beta$-ol-20-one, 16$\alpha$,17$\alpha$-isopropylidenedioxy-6-ethinyl-$\Delta^{1(10),5}$-19-nor-pregnadien - 3$\beta$ - ol - 20 - one and 17,20;20,21-bismethylenedioxy-6-ethinyl-$\Delta^{1(10),5}$-19 - nor-pregnadien-3$\beta$-ol.

Example VIII

A solution of 500 mg. of 20-ethylenedioxy-$\Delta^{5(10)}$-19-nor-pregnene-3$\beta$,6-diol in 5 cc. of dioxane was treated with 0.1 cc. of concentrated hydrochloric acid, and the mixture was left at room temperature for 1 hour. It was then poured into water, extracted with methylene chloride and the organic extract washed with water to neutral, dried over anhydrous sodium sulfate and evaporated to dryness. Crystallization from acetone - hexane gave $\Delta^{1(10),5}$-19-nor-pregnadien-3$\beta$-ol-20-one, identical to that obtained in Example VI.

By the same method, the compounds below mentioned (I) were converted into the corresponding $\Delta^{1(10),5}$-19-nor-pregnadienes (II):

| I | II |
|---|---|
| 16$\alpha$-methyl-20-ethylenedioxy-$\Delta^{5(10)}$-19-nor-pregnene-3$\beta$,6-diol. | 16$\alpha$-methyl-$\Delta^{1(10),5}$-19-nor-pregnadien-3$\beta$-ol-20-one. |
| 16$\beta$-methyl-20-ethylenedioxy-$\Delta^{5(10)}$-19-nor-pregnene-3$\beta$,6-diol. | 16$\beta$-methyl-$\Delta^{1(10),5}$-19-nor-pregnadien-3$\beta$-ol-20-one. |
| 16$\alpha$,17$\alpha$-isopropylidenedioxy-20-ethylenedioxy-$\Delta^{5(10)}$-19-nor-pregnene-3$\beta$,6-diol. | 16$\alpha$,17$\alpha$-isopropylidenedioxy-$\Delta^{1(10),5}$-19-nor-pregnadien-3$\beta$-ol-20-one. |
| 20-ethylenedioxy-$\Delta^{5(10)}$-19-nor-pregnene-3$\beta$,6,17$\alpha$-triol. | $\Delta^{1(10),5}$-19-nor-pregnadiene-3$\beta$,17$\alpha$-diol-20-one. |

Example IX

There were dissolved 500 mg. of 20-ethylenedioxy-16$\alpha$-methyl-$\Delta^{5(10)}$-19-nor-pregnene-3$\beta$,6,17$\alpha$-triol in 30 cc. of dioxane, treated with 50 mg. of p-toluenesulfonic acid, and the reaction mixture kept at room temperature for 4 hours. It was then poured into ice water, extracted with ethyl acetate and the organic extract washed with water to neutral, dried and evaporated to dryness. Addition of ether gave 16$\alpha$-methyl-$\Delta^{1(10),5}$-19-nor-pregnadiene-3$\beta$,17$\alpha$-diol-20-one.

Example X

In accordance with the method described in the preceding Example, the compounds obtained in Example V were treated with p-toluenesulfonic acid in dioxane solution, thus producing the following compounds:

6-16$\alpha$-dimethyl-$\Delta^{1(10),5}$-19-nor-pregnadien-3$\beta$-ol-20-one,
6,16$\beta$-dimethyl-$\Delta^{1(10),5}$-19-nor-pregnadien-3$\beta$-ol-20-one,
6-methyl-16$\alpha$,17$\alpha$-isopropylidenedioxy-$\Delta^{1(10),5}$-19-nor-pregnadiene-3$\beta$-ol-20-one,
6-methyl-$\Delta^{1(10),5}$-19-nor-pregnadiene-3$\beta$,17$\alpha$-diol-20-one,
6,16$\alpha$-dimethyl-$\Delta^{1(10),5}$-19-nor-pregnadiene-3$\beta$,17$\alpha$-diol-20-one,
6-vinyl-16$\alpha$-methyl-$\Delta^{1(10),5}$-19-nor-pregnadien-3$\beta$-ol-20-one,
6-vinyl-16$\beta$-methyl-$\Delta^{1(10),5}$-19-nor-pregnadien-3$\beta$-ol-20-one,
6-vinyl-16$\alpha$,17$\alpha$-isopropylidenedioxy-$\Delta^{1(10),5}$-19-nor-pregnadien-3$\beta$-ol-20-one,
6-vinyl-$\Delta^{1(10),5}$-19-nor-pregnadiene-3$\beta$,17$\alpha$-diol-20-one,
6-vinyl-16$\alpha$-methyl-$\Delta^{1(10),5}$-19-nor-pregnadiene-3$\beta$,17$\alpha$-diol-20-one,
6-propargyl-16$\alpha$-methyl-$\Delta^{1(10),5}$-19-nor-pregnadien-3$\beta$-ol-20-one,
6-propargyl-16$\beta$-methyl-$\Delta^{1(10),5}$-19-nor-pregnadien-3$\beta$-ol-20-one,
6-propargyl-16$\alpha$,17$\alpha$-isopropylidenedioxy-$\Delta^{1(10),5}$-19-nor-pregnadien-3$\beta$-ol-20-one,
6-propargyl-$\Delta^{1(10),5}$-19-nor-pregnadiene-3$\beta$,17$\alpha$-diol-20-one and
6-propargyl-16$\alpha$-methyl-$\Delta^{1(10),5}$-19-nor-pregnadien-3$\beta$,17$\alpha$-diol-20-one.

Example XI

By following the method described in Example I, 5 g. of 3 - acetoxy - 17,20;20,21-bismethylenedioxy-$\Delta^{5(10)}$-19-nor-pregnen-6-one were reduced with lithium aluminum hydride in tetrahydrofuran, to produce 17,20;20,21-bismethylenedioxy-$\Delta^{5(10)}$-19-nor-pregnene-3$\beta$,6-diol.

The foregoing compound was treated with hydrochloric acid in dioxane solution, in accordance with the method described in Example VIII, thus yielding 17,20;20,21-bismethylenedioxy-$\Delta^{1(10),5}$-19-nor-pregnadien-3$\beta$-ol.

A mixture of 1 g. of this compound and 20 cc. of 60% formic acid was heated on the steam bath for 1 hour, cooled diluted with water and the formed precipitate collected by filtration, washed with water, and dried and recrystallized from acetone-hexane, thus producing $\Delta^{1(10),5}$-19-nor-pregnadiene-3$\beta$,17$\alpha$,21-triol-20-one.

A mixture of 500 mg. of the preceding compound, 2 cc. of pyridine and 2 cc. of acetic anhydride was allowed to stand at room temperature for 4 hours, poured into water and the formed precipitate collected by filtration, to produce the 3,21-diacetate of $\Delta^{1(10),5}$-19-nor-pregnadiene-3$\beta$,17$\alpha$,21-triol-20-one.

Example XII

The preceding example was repeated but using 3-acetoxy - 17,20;20,21 - bismethylenedioxy - $\Delta^{5(10)}$,19-nor-pregnene-6,11-dione as starting material to produce successively: 17,20;20,21 - bismethylenedioxy-$\Delta^{5(10)}$-19-nor-pregnene-3$\beta$,6,11$\beta$-triol, 17,20;20,21 - bismethylenedioxy-$\Delta^{1(10),5}$-19-nor-pregnadiene - 3$\beta$,11$\beta$-diol, $\Delta^{1(10),5}$-19 - nor-pregnadiene-3$\beta$,11$\beta$,17$\alpha$,21-tetrol-20 - one and the 3,21-diacetate of $\Delta^{1(10),5}$-19 - nor - pregnadiene - 3$\beta$,11$\beta$,17$\alpha$,21-tetrol-20-one.

Example XIII

A solution of 1 g. of the foregoing diacetate in 10 cc. of acetone was cooled to 0° C. and treated under nitrogen atmosphere and stirring with an 8 N chromic acid solution (prepared by mixing 26 g. of chromium trioxide with 23 cc. of concentrated sulfuric acid and dilution with water to 100 cc.) until the color of the reagent persisted in the mixture. It was stirred for 5 minutes further at 0–5° C. and diluted with water. The precipitate was filtered off, washed with water and dried under vacuo, to produce the diacetate of $\Delta^{1(10),5}$-19-nor pregnadiene-3β,17α,21-triol-11,20-dione.

Example XIV

A mixture of 1 g. of 17,20;20,21-bismethylenedioxy-$\Delta^{1(10),5}$-19-nor-pregnadien-3β-ol and 100 cc. of 50% acetic acid was heated on the steam bath under nitrogen atmosphere for 7 hours, and then concentrated under vacuo to a small volume and poured into water. The formed precipitate was collected by filtration, washed well with water, dried and recrystallized from acetone-hexane thus producing $\Delta^{1(10),5}$-19-nor-pregnadiene-3β,17α,21-triol-20-one, identical to the product obtained in Example XI.

Example XV

A mixture of 1 g. of $\Delta^{1(10),5}$-19-nor pregnadien-3β-ol-20-one, 4 cc. of pyridine and 2 cc. of acetic anhydride was kept at room temperature overnight, it was then poured into ice water and the formed precipitate filtered off, washed with water and dried. Crystallization from acetone hexane gave the acetate of $\Delta^{1(10),5}$-19-nor-pregnadien-3β-ol-20-one.

By the same method, starting from 6-methyl-$\Delta^{1(10),5}$-19-nor - pregnadien-3β-ol-20-one, 16α - methyl-6-ethinyl-$\Delta^{1(10),5}$-19-nor-pregnadiene - 3β-ol-20-one, 6-vinyl-$\Delta^{1(10),5}$-19-nor-pregnadiene - 3β - ol - 20-one and 6-propargyl-$\Delta^{1(10),5}$-19-nor-pregnadien-3β-ol-20-one there were obtained the corresponding acetates.

Example XVI

By following the method described in Example II, 3-acetoxy - 17,20;20,21 - bismethylenedioxy - $\Delta^{5(10)}$-19-nor-pregnen-6-one was treated with methyl, vinyl and propargyl magnesium bromide to produce respectively: 17,20;20,21 - bismethylene-dioxy - 6-methyl-$\Delta^{5(10)}$-19-nor-pregnene-3β,6 - diol, 17,20;20,21-bismethylenedioxy - 6 - vinyl - $\Delta^{5(10)}$-19-nor-pregnene-3β,6 - diol and 17,20;20,21-bismethylenedioxy - 6 - propargyl-$\Delta^{5(10)}$-19-nor-pregnene-3β,6 - diol, which upon treatment with 50% acetic acid, 7 hours on the steam bath gave as final products 6-methyl-$\Delta^{1(10),5}$-19-nor - pregnadiene-3β,17α,21 - triol-20-one, 6 - vinyl-$\Delta^{1(10),5}$-19-nor-pregnadiene-3β,17α,21 - triol - 20 - one, and 6 - propargyl-$\Delta^{1(10),5}$-19-nor-pregnadiene-3β,17α,21-triol-20-one.

Example XVII

In accordance with the method described in Example XV, the compounds below mention (I) were treated with the indicated anhydrides, to produce the respective mono or diesters (II):

| I | Anhydride | II |
|---|---|---|
| $\Delta^{1(10),5}$-19-nor-pregnadien-3β-ol-20-one | Propionic | Propionate of $\Delta^{1(10)}$-19-nor-pregnadien-3β-ol-20-one. |
| $\Delta^{1(10),5}$-19-nor-pregnadiene-3β,17α-diol-20-one. | Caproic | 3-caproate of $\Delta^{1(10),5}$-19-nor-pregnadiene-3β,17α-diol-20-one. |
| $\Delta^{1(10),5}$-19-nor-pregnadiene-3β,17α,21-triol-20-one. | Cyclopentylpropionic | 3,21-dicyclopentylpropionate of $\Delta^{1(10),5}$-19-nor-pregnadiene-3β,17α,21-triol-20-one. |
| 16α-methyl-$\Delta^{1(10),5}$-19-nor-pregnadiene-3β,17α-diol-20-one. | Acetic | 3-acetate of 16α-methyl-$\Delta^{1(10),5}$-19-nor-pregnadiene-3β,17α-diol-20-one. |
| 6,16α-dimethyl-$\Delta^{1(10),5}$-19-nor-pregnadiene-3β,17α-diol-20-one. | Propionic | 3-propionate of 6,16α-dimethyl-$\Delta^{1(10),5}$-19-nor-pregnadiene-3β,17α-diol-20-one. |
| 6-vinyl-16α-methyl-$\Delta^{1(10),5}$-19-nor-pregnadien-3β-ol-20-one. | Caproic | Caproate of 6-vinyl-16α-methyl-$\Delta^{1(10),5}$-19-nor-pregnadien-3β-ol-20-one. |
| 6-methyl-16α,17α-isopropylidenedioxy-$\Delta^{1(10),5}$-19-nor-pregnadien-3β-ol-20-one. | Acetic | Acetate of 6-methyl-16α,17α-isopropylidene-dioxy-$\Delta^{1(10),5}$-19-nor-pregnadien-3β-ol-20-one. |
| 6-methyl-$\Delta^{1(10),5}$-19-nor-pregnadiene-3β,17α,21-triol-20-one. | Propionic | 3,21-dipropionate of 6-methyl-$\Delta^{1(10),5}$-19-nor-pregnadiene-3β,17α,21-triol-20-one. |
| 6-vinyl-$\Delta^{1(10),5}$-19-nor-pregnadiene-3β,17α,21-triol-20-one. | Acetic | 3,21-diacetate of 6-vinyl-$\Delta^{1(10),5}$-19-nor-pregnadiene-3β,17α,21-triol-20-one. |
| $\Delta^{1(10),5}$-19-nor-pregnadiene-3β,11β,17α,21-tetrol-20-one. | Caproic | 3,21-dicaproate of $\Delta^{1(10),5}$-19-nor-pregnadiene-3β,11β,17α,21-tetrol-20-one. |

Example XVIII

To a solution of 1 g. of $\Delta^{1(10),5}$-19-nor-pregnadiene-3β,17α-diol-20-one in 100 cc. of anhydrous benzene there were added 200 mg. of p-toluenesulfonic acid and 4 cc. of acetic anhydride, and the mixture was kept at room temperature for 24 hours, poured into water and the resulting mixture stirred to effect hydrolysis of the excess anhydride. The benzene layer was separated and washed with 10% sodium carbonate solution and water. Drying, evaporation and crystallization of the residue from ether-hexane gave the diacetate of $\Delta^{1(10),5}$-19-nor-pregnadiene-3β,17β-diol-20-one.

In the same manner, 16α - methyl - $\Delta^{1(10),5}$-19-nor-pregnadiene-3β,17α-diol-20-one, 16β - methyl - $\Delta^{1(10),5}$ - 19-nor - pregnadiene - 3β,17α - diol - 20 - one, 6,16α-dimethyl - $\Delta^{1(10),5}$-19-nor-pregnadiene-3β,17α-diol - 20 - one and 6 - vinyl-16α-methyl-$\Delta^{1(10),5}$-19-nor-pregnadiene-3β,17α-diol-20-one were esterified with acetic, caproic and cyclopentylpropionic anhydrides, thus yielding the respective diacetates, dicaproates and dicyclopentylpropionates.

Example XIX

A solution of 1 g. of the diacetate of $\Delta^{1(10),5}$-19-nor-pregnadiene-3β,17α-diol-20-one in 50 cc. of methanol was treated with 5 cc. of 4% aqueous potassium hydroxide solution; the reaction mixture was stirred at 0° C. for 1 hour under nitrogen atmosphere, neutralized with acetic acid and the methanol was distilled under reduced pressure. The residue was triturated with water, dried and recrystallized from ethyl acetate-methanol, to produce the 17-monoacetate of $\Delta^{1(10),5}$-19 - nor-pregnadiene - 3β,17α-diol-20-one.

The foregoing compound was treated with propionic anhydride in pyridine solution, 4 hours at room temperature, to produce the 3-propionate-17-acetate of $\Delta^{1(10),5}$-19-nor-pregnadiene-3β,17α-diol-20-one.

Example XX

In accordance with the hydrolysis procedure described in the preceding example, the diacetate of 16α-methyl-$\Delta^{1(10),5}$ - 19 - nor pregnadiene-3β,17α-diol-20-one, the dicaproate of 16β-methyl-$\Delta^{1(10),5}$-19-nor-pregnadiene-3β,17α-diol-20-one, the dicyclopentylpropionate of 6,16α-dimethyl - $\Delta^{1(10),5}$ - 19 - nor-pregnadiene-3β,17α-diol-20-one and the diacetate of 6-vinyl-16α-methyl-$\Delta^{1(10),5}$-19-nor-pregnadiene-3β,17α-diol-20-one were converted into the respective monoesters, i.e. 17-acetate of 16α-methyl-$\Delta^{1(10),5}$ - 19-nor-pregnadiene-3β,17α-diol-20-one. 17-caproate of 16β - methyl-$\Delta^{1(10),5}$-19-nor pregnadiene-3β,17α-diol-20-one, 17-cyclopentylpropionate of 6,16α-dimethyl-$\Delta^{1(10),5}$ - 19-nor-pregnadiene-3β,17α-diol-20-one and 17- acetate of 6-vinyl-16α-methyl-Δ$^{1(10),5}$-19-nor-pregnadiene-3β,17α-diol-20-one.

*Example XXI*

A cooled solution of 4 g. of the 3-acetate of 16α-methyl-Δ$^{1(10),5}$-19-nor-pregnadiene-3β,17α-diol-20-one in 30 cc. of tetrahydrofuran and 18 cc. of methanol was treated under continuous stirring with 6 g. of pure calcium oxide, in small portions, and then with 6 g. of iodine. The stirring was continued at room temperature until the solution turned pale yellow. The mixture was poured into ice water containing 18 cc. of acetic acid and 2 g. of sodium thiosulfate. After stirring for 15 minutes the solution was decanted and the precipitate was collected by filtration, thus giving the 3-acetate of 21-iodo-16α-methyl-Δ$^{1(10),5}$-19-nor-pregnadiene-3β,17α-diol-20-one.

This compound was mixed with 80 cc. of acetone and 12 g. of recently fused potassium acetate and the mixture was refluxed for 8 hours, concentrated to a small volume, diluted with water and extracted with ethyl acetate; the extract was washed with water, dried over anhydrous sodium sulfate and concentrated until crystallization started. The precipitate was collected and crystallized from methanol-water, thus yielding the 3,21-diacetate of 16α-methyl-Δ$^{1(10),5}$-19-nor-pregnadiene-3β,17α,21-triol-20-one.

By the same method, the acetate of 6-methyl-16α,17α-isopropylidenedioxy - Δ$^{1(10),5}$ - 19-nor-pregnadiene-3β,21-20-one was converted into the 3,21-diacetate of 6-methyl-16α,17α - isopropylidenedioxy - Δ$^{1(10),5}$ - 19-nor-pregnadiene-3β,21-diol-20-one.

*Example XXII*

A mixture of 1 g. of the 3,21-diacetate of 16α-methyl-Δ$^{1(10),5}$-19-nor-pregnadiene-3β,17α,21-triol-20-one, 25 cc. of methanol and 5 cc. of a 5% potassium hydroxide solution was stirred at 0° C. for 1 hour under nitrogen atmosphere, it was diluted with water and the formed precipitate collected by filtration to produce 16α-methyl-Δ$^{1(10),5}$-19-nor-pregnadiene-3β,17α,21-triol-20-one.

In the same manner, the diacetate of 6-methyl-16α,17α-isopropylidenedioxy - Δ$^{1(10),5}$ - 19 - nor-pregnadien-3β,21-diol-20-one was converted into the free compound, i.e. 6 - methyl - 16α,17α-isopropylidenedioxy-Δ$^{1(10),5}$-19-nor-pregnadiene-3β,21-diol-20-one.

*Example XXIII*

A strain of *Curvularia lunata* ATCC 13935 was grown in a Sabourini-glucose-agar medium (Difco). The growth obtained after incubating for a week at 25° C. was suspended in 5 cc. of sterile water. This suspension was divided in 5 portions of 1 cc. each which were employed for inoculating 5 Erlenmeyer flasks of 250 cc. capacity containing each 50 cc. of a culture medium of the following composition:

|  | G. |
|---|---|
| Glucose | 20 |
| (NH$_4$)$_2$HPO$_4$ | 5 |
| or |  |
| NaNO$_3$ | 3 |
| K$_2$HPO$_4$ | 1 |
| MgSO$_4$·7H$_2$O | 0.2 |
| KCl | 0.5 |
| ZnSO$_4$ | Traces |
| FeSO$_4$·7H$_2$O | Traces |
| Distilled water to complete 1 lt. |  |

The cultures were incubated under rotatory stirring for 72 hours at 25° C. The growth was homogenized for 1 minute in a Waring Blendor; 2 cc. portions of the suspension thus obtained were employed for inoculating approximately 100 Erlenmeyer flasks containing the same medium described above. The mixtures were incubated for 24 hours under rotatory stirring at 25° C. and 280 r.p.m.; to each flask there was added 0.5 cc. of a solution of 0.5 g. of 16α-methyl-Δ$^{1(10),5}$-19-nor-pregnadiene-3β,17α,21-triol-20-one in 50 cc. of 95% ethanol and the incubation was continued under the same conditions for 48 hours. The contents of the flasks were combined and extracted with four portions of methylene chloride. The combined extract was dried over anhydrous sodium sulfate and concentrated at low temperature to a volume of 25 cc. This solution was adsorbed on 4 g. of silica gel and eluted with methylene chloride (9:1) to produce 16α-methyl-Δ$^{1(10),5}$-19-nor-pregnadiene-3β,11β,17α,21-tetrol-20-one.

The foregoing compound was esterified with acetic anhydride in pyridine, and the 3,21-diacetate was oxidized with 8 N chromic acid, thus yielding the 3,21-diacetate of 16α - methyl - Δ$^{1(10),5}$-19-nor-pregnadiene-3β,17α-21-triol-11,20-dione.

*Example XXIV*

In accordance with the method described in the preceding example, the compounds below mentioned (I) were incubated with a culture of *Curvularia lunata* to produce the corresponding 11β-hydroxylated derivatives.

| I | II |
|---|---|
| 6-methyl-16α,17α-isopropylidenedioxy-Δ$^{1(10),5}$-19-nor-pregnadiene-3β,21-diol-20-one. | 6-methyl-16α,17α-isopropylidenedioxy-Δ$^{1(10),5}$-19-nor-pregnadiene-3β,11β,21-triol-20-one. |
| 6-methyl-Δ$^{1(10),5}$-19-nor-pregnadiene-3β,17α,21-triol-20-one. | 6-methyl-Δ$^{1(10),5}$-19-nor-pregnadiene-3β,11β,17α,21-tetrol-20-one. |
| 6-vinyl-Δ$^{1(10),5}$-19-nor-pregnadiene-3β,17α,21-triol-20-one. | 6-vinyl-Δ$^{1(10),5}$-19-nor-pregnadiene-3β,11β,17α,21-tetrol-20-one. |
| 6-propargyl-Δ$^{1(10),5}$-19-nor-pregnadiene-3β,17α,21-triol-20-one. | 6-propargyl-Δ$^{1(10),5}$-19-nor-pregnadiene-3β,11β,17α,21-tetrol-20-one. |

*Example XXV*

The compounds obtained in the preceding example were esterified with acetic anhydride in pyridine and the 3,21-diacetates thus obtained were oxidized with 8 N chromic acid in acetone, by following the method described in Example XIII, thus yielding as final products: 3,21-diacetate of 6-methyl-16α,17α-isopropylidenedioxy-Δ$^{1(10),5}$ - 19 - nor-pregnadiene-3β,21-diol-11,20-dione, the 3,21-diacetate of 6-methyl-Δ$^{1(10),5}$-19-nor-pregnadiene-3β,17α,21 - triol - 11,20-dione, the 3,21-diacetate of 6-vinyl - Δ$^{1(10),5}$ - 19-nor-pregnadiene-3β,17α-21-triol-11,20-dione, and the 3,21-diacetate of 6-propargyl-Δ$^{1(10),5}$-19-nor-pregnadiene-3β,17α,21-triol-11,20-dione.

*Example XXVI*

By following the method described in Example XXIII, 1 g. of 17,20;20,21-bismethylenedioxy-6-ethinyl-Δ$^{1(10),5}$-19-nor-pregnadien-3β-ol was incubated with a culture of *Curvularia lunata* to produce 17,20;20,21-bismethylenedioxy-6-ethinyl-Δ$^{1(10),5}$-19-nor-pregnadiene-3β,11β-diol.

Upon hydrolysis of the bismethylenedioxy group with 60% formic acid, there was obtained 6-ethinyl-Δ$^{1(10),5}$-19-nor-pregnadiene-3β,11β,17α,21-tetrol-20-one, that was esterified with propionic anhydride in pyridine to produce the 3,21-dipropionate of 6-ethinyl-Δ$^{1(10),5}$-19-nor-pregnadiene-3β,11β,17α,21-tetrol-20-one.

100 mg. of the foregoing compound were oxidized with 8 N chromic acid in acetone. In accordance with the method described in Example XIII, to produce the 3,21-dipropionate of 6-ethinyl-Δ$^{1(10),5}$-19-nor-pregnadiene-3β,17α,21-triol-11,20-dione.

*Example XXVII*

In accordance with the method described in Example XXII the 3,21-diacetate of Δ$^{1(10),5}$-19-nor-pregnadiene-3β,17α,21-triol-11,20-dione, the 3,21-diacetate of 16α-methyl - Δ$^{1(10),5}$ - 19-nor-pregnadiene-3β,17α,21-triol-11,20-dione, the 3,21-diacetate of 6-methyl-Δ$^{1(10),5}$-19-nor-pregnadiene - 3β,17α,21 - triol-11,20-dione and the 3,21-diacetate of 6 - methyl - 16α,17α - isopropylidenedioxy-Δ$^{1(10),5}$ - 19 - nor-pregnadiene-3β,17α,21-triol-11,20-dione were converted into the corresponding free compounds.

Example XXVIII

A culture of *Streptomyces roseochromogenus* ATCC 3347 was prepared in an inclined agar medium containing 1% of glucose and 1% of yeast extract. 1 cc. of a suspension of this culture was then used to inoculate each one of a series of 250 cc. flasks containing 50 cc. of a sterilized aqueous medium of 2% peptone and 5% corn syrup, the mixtures were then incubated in a shaking machine at 28° C. under aeration for a period of 24-48 hours. There was thus obtained a vegetating growing culture of *Streptomyces roseochromogenus* which was used for the subsequent incubation of the steroid.

10 mg. of $\Delta^{1(10),5}$-19-nor-pregnadiene-3β,17α-diol-20-one were added to each 50 cc. of the vegetating culture of *Streptomyces roseochromogenus*, obtained as described above. The mixture was stirred for 48-72 hours with aeration and then extracted several times with methylene dichloride. The extract was washed with water, dried over anhydrous sodium sulfate, filtered and evaporated under reduced pressure.

The residue was purified by chromatography in silica gel, thus giving $\Delta^{1(10),5}$-19-nor-pregnadiene-3β,16α,17α-triol-20-one.

The foregoing compound was esterified with acetic anhydride in pyridine solution, to produce the 3,16-diacetate of $\Delta^{1(10),5}$-19-nor-pregnadiene-3β,16α,17α-triol-20-one.

Example XXIX

By following the incubation method described in the preceding Example, $\Delta^{1(10),5}$-19-nor-pregnadiene-3β,11β,17α,21 - tetrol-20-one and 6-methyl-$\Delta^{1(10),5}$-19-nor-pregnadiene-3β,17α,21-triol-11,20-dione were converted respectively into $\Delta^{1(10),5}$ - 19 - nor-pregnadiene-3β,11β,16α,17α,21-pentol-20-one and 6-methyl-$\Delta^{1(10),5}$-19-nor-pregnadiene-3β,16α,17α,21-tetrol-11,20-dione.

We claim:
1. A compound of the following formula:

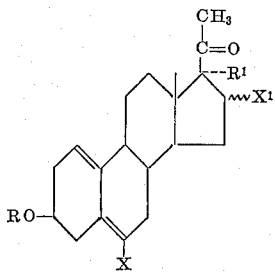

wherein X is selected from the group consisting of hydrogen, lower alkyl, lower alkenyl and lower alkinyl; R is selected from the group consisting of hydrogen and an acyl radical of less than 12 carbon atoms; $R^1$ is selected from the group consisting of hydrogen, hydroxy and acyloxy of less than 12 carbon atoms; $X^1$ is selected from the group consisting of hydrogen, α-methyl, β-methyl, α-hydroxy and α-acyloxy of less than 12 carbon atoms and $R^1$ and $X^1$ together represent the grouping

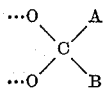

wherein A is selected from the group consisting of hydrogen and lower alkyl and B is selected from the group consisting of lower alkyl, aryl and aralkyl of up to 8 carbon atoms.

2. $\Delta^{1(10),5}$-19-nor-pregnadien-3β-ol-20-one.
3. 16-methyl-$\Delta^{1(10),5}$-19-nor-pregnadien-3β-ol-20-one.
4. 16α,17α-isopropylidenedioxy-$\Delta^{1(10),5}$-19-nor-pregnadien-3β-ol-20-one.
5. $\Delta^{1(10),5}$-19-nor-pregnadiene-3β,17α-diol-20-one.
6. 16α-methyl-$\Delta^{1(10),5}$-19-nor-pregnadiene-3β,17α-diol-20-one.
7. 6-methyl-$\Delta^{1(10),5}$-19-nor-pregnadiene-3β-ol-20-one.
8. 6-ethinyl-$\Delta^{1(10),5}$-19-nor-pregnadiene-3β-ol-20-one.
9. 6,16α-dimethyl-$\Delta^{1(10),5}$-19-nor-pregnadiene-3β-ol-20-one.
10. 6-methyl-16α,17α-isopropylidenedioxy-$\Delta^{1(10),5}$-19-nor-pregnadien-3β-ol-20-one.
11. A compound of the following formula:

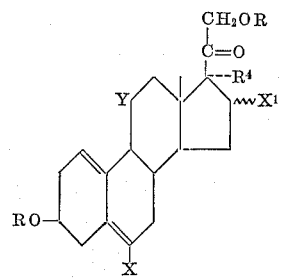

wherein R is selected from the group consisting of hydrogen and an acyl radical of less than 12 carbon atoms; X is selected from the group consisting of hydrogen, lower alkyl, lower alkenyl and lower alkinyl; Y is selected from the group consisting of hydrogen, β-hydroxy and keto; $R^4$ represents hydroxy; $X^1$ is selected from the group consisting of hydrogen, α-methyl, β-methyl, α-hydroxy, α-acyloxy of less than 12 carbon atoms and $X^1$ and $R^4$ together represent the grouping

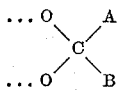

wherein A is selected from the group consisting of hydrogen and lower alkyl and B is selected from the group consisting of lower alkyl, aryl and aralkyl of up to 8 carbon atoms.

12. $\Delta^{1(10),5}$-19-nor-pregnadiene-3β-17α,21-triol-20-one.
13. $\Delta^{1(10),5}$-19-nor-pregnadiene-3β,11β,17α,21-tetrol-20-one.
14. $\Delta^{1(10),5}$-19-nor-pregnadiene-3β,17α,21-triol-11,20-dione.
15. 16α-methyl-$\Delta^{1(10),5}$-19-nor-pregnadiene-3β,11β,17α,21-tetrol-20-one.
16. 16α-methyl-$\Delta^{1(10),5}$-19-nor-pregnadiene-3β,17α,21-triol-11,20-dione.
17. 6-methyl-16α,17α-isopropylidenedioxy-$\Delta^{1(10),9}$-19-nor-pregnadiene-3β,11β,21-triol-20-one.
18. 6-methyl-$\Delta^{1(10),5}$-19-nor-pregnadiene-3β,11β,17α,21-tetrol-20-one.
19. 6-vinyl-$\Delta^{1(10),5}$-19-nor-pregnadiene-3β,11β,17α,21-tetrol-20-one.
20. 6-ethinyl-$\Delta^{1(10),5}$-19-nor-pregnadiene-3β,11β,17α,21-tetrol-20-one.

No references cited.

LEWIS GOTTS, *Primary Examiner.*

THOMAS M. MESHBESHER, *Assistant Examiner.*